(12) United States Patent
Strohmayer et al.

(10) Patent No.: US 9,779,842 B2
(45) Date of Patent: Oct. 3, 2017

(54) NUCLEAR FACILITY POOL CLEANING DEVICE

(71) Applicant: WESTINGHOUSE ELECTRIC GERMANY GMBH, Mannheim (DE)

(72) Inventors: Thomas Strohmayer, Ladenburg (DE); Dominik Demtröder, Mannheim (DE); Udo Weintrager, Mannheim (DE)

(73) Assignee: WESTINGHOUSE ELECTRIC GERMANY GMBH, Mannheim (DE)

( * ) Notice: Subject to any disclaimer, the term of this patent is extended or adjusted under 35 U.S.C. 154(b) by 34 days.

(21) Appl. No.: 14/944,777

(22) Filed: Nov. 18, 2015

(65) Prior Publication Data
US 2016/0148711 A1 May 26, 2016

(30) Foreign Application Priority Data

Nov. 21, 2014 (EP) .................................. 14003916

(51) Int. Cl.
| | |
|---|---|
| *G21C 17/01* | (2006.01) |
| *B01D 21/24* | (2006.01) |
| *G21C 19/07* | (2006.01) |
| *E02F 3/88* | (2006.01) |
| *G21F 9/28* | (2006.01) |
| *G21F 9/34* | (2006.01) |
| *G21C 19/32* | (2006.01) |

(52) U.S. Cl.
CPC ......... *G21C 19/07* (2013.01); *B01D 21/2477* (2013.01); *E02F 3/8833* (2013.01);
(Continued)

(58) Field of Classification Search
CPC .............. B01D 21/245; B01D 21/2477; B01D 21/2483; E02F 3/8833; E02F 3/8858;
(Continued)

(56) References Cited

U.S. PATENT DOCUMENTS

| | | | | |
|---|---|---|---|---|
| 4,152,800 A | * | 5/1979 | Nilsmar ............... | B01D 21/245 |
| | | | | 210/242.1 |
| 4,374,024 A | * | 2/1983 | Peloquin ................. | B05C 17/00 |
| | | | | 15/1.7 |

(Continued)

FOREIGN PATENT DOCUMENTS

| | | | |
|---|---|---|---|
| EP | 0 461 506 A1 | | 12/1991 |
| EP | 2492403 | * | 8/2012 |
| WO | 2013/030005 A1 | | 3/2013 |

OTHER PUBLICATIONS

European Search Report dated Jun. 12, 2015, by the European Patent Office in corresponding European Patent Application No. 14003916. (1 page).

*Primary Examiner* — Christopher Upton
(74) *Attorney, Agent, or Firm* — Buchanan Ingersoll & Rooney PC

(57) ABSTRACT

The invention relates to a nuclear facility pool cleaning device having a floating platform, capable of floating in water, having buoyancy bodies; a drive device for displacing the floating platform on the surface of a water-filled nuclear facility pool to be cleaned; a winching device connected to the floating platform; a pump which is winchable vertically by the winching device and has a vacuum hose, connected thereto at its first end, for cleaning the bottom of the nuclear facility pool; a remote control device for remotely operating at least the drive device and the winching device; an optional stationary external storage tank; and wherein the second end of the vacuum hose preferably leads at least indirectly into the stationary external storage tank.

20 Claims, 3 Drawing Sheets

Figure 1:
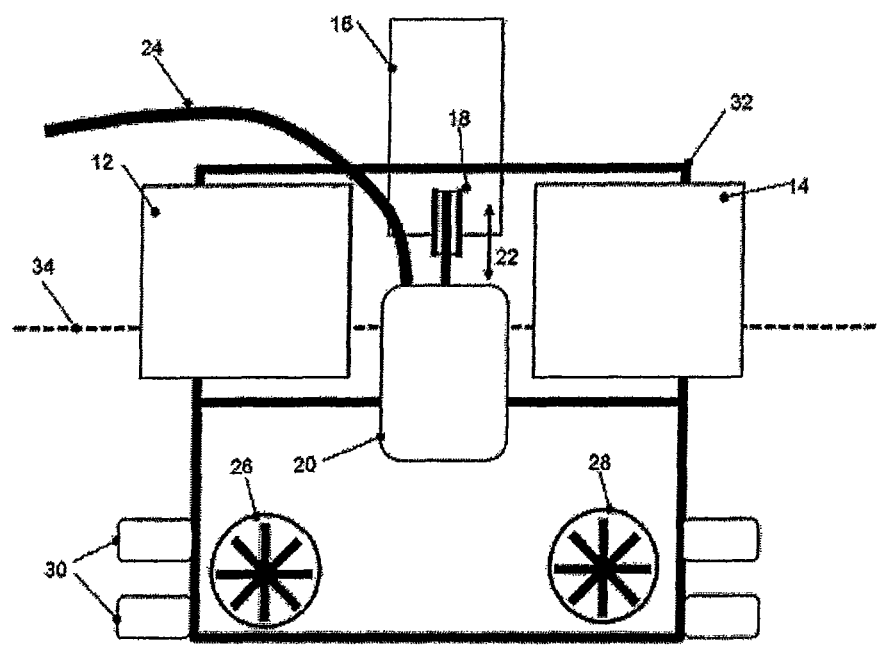

(52) U.S. Cl.
CPC ............ *E02F 3/8866* (2013.01); *G21C 17/01* (2013.01); *G21C 19/32* (2013.01); *G21F 9/28* (2013.01); *G21F 9/34* (2013.01)

(58) Field of Classification Search
CPC ........ E02F 3/8866; E04H 4/16; E04H 4/1654; G21C 17/01; G21C 19/32
USPC ... 210/167.16, 170.04, 170.05, 172.1, 172.2, 210/242.1, 523, 803; 15/1.7; 37/308, 37/317, 320; 376/308
See application file for complete search history.

(56) References Cited

U.S. PATENT DOCUMENTS

| | | | |
|---|---|---|---|
| 4,959,146 A * | 9/1990 | Kristan | B01D 29/33 210/167.16 |
| 5,193,405 A | 3/1993 | Oomichi et al. | |
| 5,198,125 A * | 3/1993 | Coudriet | B01D 21/2477 210/803 |
| 5,490,920 A * | 2/1996 | Fruchtbaum | B01D 21/245 210/527 |
| 6,219,399 B1 * | 4/2001 | Naruse | G21C 19/32 376/308 |
| 6,432,304 B1 * | 8/2002 | Nguyen | B63B 13/02 210/242.1 |
| 7,776,223 B2 * | 8/2010 | Chang | B01D 21/2483 210/170.04 |
| 2009/0026131 A1 * | 1/2009 | Nielsen | B01D 21/2477 210/523 |
| 2014/0224360 A1 * | 8/2014 | Miller | B01D 21/2483 137/565.23 |
| 2014/0246050 A1 | 9/2014 | Klintberg | |

* cited by examiner

NUCLEAR FACILITY POOL CLEANING DEVICE

The invention relates to a nuclear facility pool cleaning device. It is known that in nuclear facilities, for example a nuclear power plant, spent nuclear fuel is temporarily stored. Such storage typically takes place in a water pool, or a nuclear facility pool, which—depending on the local conditions—can also be located in the open outside a building.

On account of the introduction of organic particles such as leaves, dirt, dust or the like, this being unavoidable in the open, a sludge-like sediment accumulates over time in such a nuclear facility pool. The sludge consists largely of organic material and to a small extent of highly radioactive fuel particles. The temporarily stored nuclear fuel itself is usually located in tipping-trough-like storage containers made of sheet steel, which for their part are located at an indeterminate position in the nuclear facility pool. Suspended matter in the water limits the view into the water pool, and so it is difficult to optically locate the storage containers.

In order to be able to remove the storage containers holding the nuclear fuel, usually highly radioactive fuel elements, from the pool for disposal, a large part of the sludge has to be removed beforehand from the nuclear facility pool. According to the prior art, the sludges are pumped out by submersible pumps suspended on cranes that reach over the nuclear facility pool, wherein such cranes are set up only temporarily for the purpose of pumping away the sludge. A disadvantage here is the great width of the nuclear facility pool, for example 20 m-30 m, this making a truck crane with a correspondingly large span or a gantry crane that travels on rails necessary. In addition, the accessibility of the pool edge is highly limited depending on the local conditions, for example by adjoining buildings or by an already present gantry crane.

Proceeding from this prior art, it is the object of the invention to provide a nuclear facility pool cleaning device which is particularly flexible to use and which can also be used in confined spatial conditions around the nuclear facility pool to be cleaned.

This object is achieved by a nuclear facility pool cleaning device according to the invention. Said device is characterized by
- a floating platform, capable of floating in water, having buoyancy bodies,
- a drive device for displacing the floating platform on the surface of a water-filled nuclear facility pool to be cleaned,
- a winching device connected to the floating platform,
- a pump which is winchable vertically by the winching device and has a vacuum hose, connected thereto at its first end, for cleaning the bottom of the nuclear facility pool,
- a remote control device for remotely operating at least the drive device and the winching device,
- an optional stationary external storage tank,
- wherein the second end of the vacuum hose preferably leads at least indirectly into the stationary external storage tank.

The underlying idea of the invention consists in using, instead of a stationary crane, a remote-controlled floating platform that is capable of floating, said floating platform having a suction pump, lowerable to the level of the pool bottom, for the sludge to be removed. As a result of the use of buoyancy bodies, which are arranged for example in a plurality of mutually spaced-apart groups, great tilting stability is advantageously ensured such that force loads, which can occur for example as a result of the suction hose being drawn behind, do not endanger the stable floating position of the floating platform. In order to further avoid torque- or tilting-moment-like loads, the winching device is preferably arranged centrally on the floating platform above an aperture, such that the pump that is downwardly winchable through the aperture with the suction hose also does not endanger the stable floating position of the floating platform by a tilting moment.

The remote control device for the drives and also the winching device allow the floating platform to be manoeuvred in the nuclear facility pool without risk to the operating personnel. On account of the small dimensions of the floating platform, for example with an area of 1.5 m×2 m, even poorly accessible regions of the nuclear facility pool are easy to reach and to clean. To this end, the pump is lowered to the level of the pool bottom and activated such that the pool bottom is vacuumed. Given a corresponding displacement movement of the floating platform, the pool bottom is completely cleaned and the storage containers exposed such that they can subsequently be removed from the nuclear facility pool and sent for disposal. The vacuumed sludge-containing water is in this case pumped for example into a stationary external storage tank at the pool edge. There, the sludge is optionally screened out and the cleaned water is fed back into the nuclear facility pool.

On account of the difficult radiological conditions in and at the nuclear facility pool, the floating platform should not as far as possible be lifted out of the water, but rather remain permanently therein. Therefore, components which optionally are potentially to be exchanged should be secured with remotely releasable closures.

According to a particularly preferred configuration of the floating platform according to the invention, a connecting assembly is provided at the second end of the vacuum hose, said connecting assembly connecting said second end to the first end of a discharge hose. By way of such a connecting assembly and the division of the hose into a vacuum hose and a discharge hose, the structure or installation of the system according to the invention is advantageously simplified. The connecting assembly can optionally also comprise a winding device for one of the two hoses, such that relatively long hose loops are avoided. This allows easier maneuvering of the floating platform.

According to a further configuration of the nuclear facility pool cleaning device according to the invention, the connecting assembly is connected to the floating platform. In this way, functionalities which require an additional assembly, for example a prefilter for the vacuumed water, can be installed easily on board the floating platform.

According to a further variant of the nuclear facility pool cleaning device according to the invention, the length of the vacuum hose corresponds at least to the depth of the nuclear facility pool to be cleaned. This ensures that the pump can be winched as far as the pool bottom.

According to a further configuration variant of the nuclear facility pool cleaning device according to the invention, the pump is winchable by means of the winching device from an upper position within the floating platform to a lower position beneath the water surface, in particular onto the bottom of the nuclear facility pool to be cleaned. In the upper position, the pump and also the vacuum hose are located above the water surface, for example at a distance of 500 mm. This avoids a continuous load on the pump by the water, in particular for the time in which the floating platform remains unused in the nuclear facility pool.

According to a particularly preferred configuration variant of the nuclear facility pool cleaning device, the drive device comprises at least three drives, specifically
one drive for axial forward motion, and
two drives for laterally displacing and rotating the floating platform.

One drive can be for example a forward-motion propeller. These three drives ensure complete maneuverability of the floating platform on the water surface of the nuclear facility pool. A rotatable forward-motion propeller is also a suitable drive. Ideally, electric motors are used.

According to a further configuration of the nuclear facility pool cleaning device, at least one overview camera is provided on the floating platform, ideally at least two thereof, specifically one in the direction of axial forward motion at the bow and one in the opposite direction at the stern of the floating platform.

According to a further preferred configuration of the nuclear facility pool cleaning device, the image data from the at least one overview camera are transferable to a display device of the remote control device and are able to be displayed there. On the basis of the image information obtained from the cameras, said information being made available to the operator of the floating platform at the remote control device, remote control of the floating platform becomes much easier. Thus, during lowering, lifting and pumping, the surroundings of the platform can be observed. Image data can be displayed either directly at the remote control device or on a screen close enough to see.

According to a further configuration of the nuclear facility pool cleaning device according to the invention, light sources for illuminating the recording region of the at least one overview camera are provided on the floating platform. LEDs are for example suitable light sources.

According to a further configuration of the nuclear facility pool cleaning device, the floating platform is connected to an external stationary transfer interface by means of a flexible cable harness that is capable of floating in water. On account of the floating capability of the cable harness, a torque or tilting moment, which could endanger the stable floating position of the floating platform, is advantageously avoided. A floating capability can be achieved for example by the provision of floating bodies which are connected to the cable harness. The transfer interface is typically formed by a plug connection at the pool edge.

According to a further configuration of the nuclear facility pool cleaning device, the cable harness that is capable of floating comprises electric power lines for supplying the floating platform with electric power, and also data lines in particular for data exchange with the remote control device. In this way, all of the required supply and communication lines for smooth operation of the floating platform are present. A control cabinet on the platform serves to actuate the cable hoist, the drives and the pump.

According to a particularly preferred configuration of the nuclear facility pool cleaning device, the floating platform has a metal frame with buoyancy bodies arranged in a manner spaced apart from one another on both sides of its axial centreline, wherein the winching device is arranged at least partially in the intermediate space formed between the buoyancy bodies. As a result of the use of a metal frame, the structure is greatly simplified. For example a multiplicity of smaller buoyancy bodies of the same type can be connected by the metal frame to a large buoyancy body. On account of the spaced-apart arrangement, the effective area of the floating platform is increased and the floating position stabilized as a result. The central intermediate space formed between the buoyancy bodies is readily suitable as a result for guiding the winching device centrally, thereby further improving the floating stability.

According to a further configuration of the nuclear facility pool cleaning device, the floating platform has horizontally at least partially encircling fenders. In the event of collisions with for example the pool edge, impacts are advantageously cushioned as a result and damage to the floating platform is avoided.

Further advantageous possible configurations can be gathered from the further dependent claims.

The invention, further embodiments and further advantages are intended to be described in more detail by way of the exemplary embodiments illustrated in the drawings.

Figure 2:
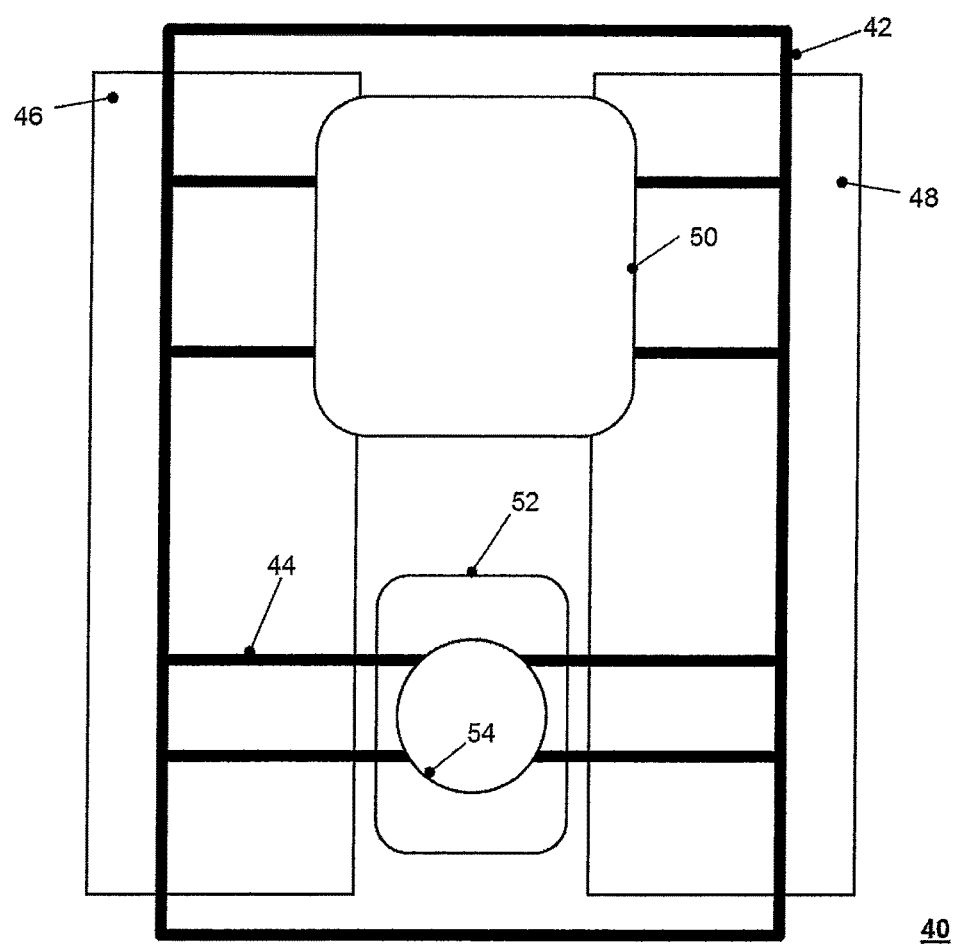
Figure 3:
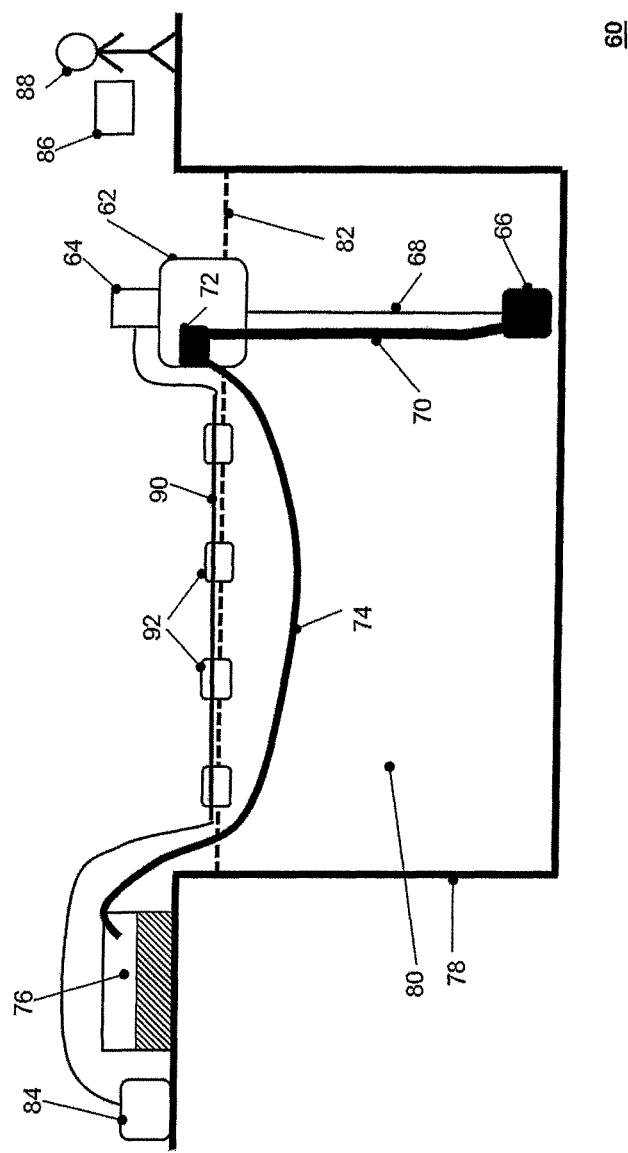

In the drawings
FIG. 1 shows a first example of a floating platform,
FIG. 2 shows a second example of a floating platform, and
FIG. 3 shows a nuclear facility pool having a nuclear facility pool cleaning device.

FIG. 1 shows a side view of a first example of a floating platform 10. Arranged on a metal frame 32, on both sides of its axial centre, are cuboidal buoyancy bodies 12, 14 which keep the floating platform 10, floating in water, at least partially above the water surface 34. Provided between the buoyancy bodies 12, 14 which are arranged in a manner spaced apart from one another is a winching device 16, in this case comprising a winch with a drive, said winching device 16 being able, by means of a cable guided over a winch sheave 18, to winch a pump 20 fastened to the end of the cable up and down in the direction of the arrow 22. The pump 20 is connected via a vacuum hose 24 to a storage tank (not illustrated) into which the pumped-out water is guided.

The floating platform 10 is fully maneuverable by means of a drive device comprising a plurality of drives 26, 28, wherein the drives 26, 28 and also the winching device 16 are remotely controllable via a remote control device (not illustrated). Arranged around the floating platform 10 are partially encircling fenders 30 which adequately cushion impacts brought about for example by collisions with the pool edge, such that damage to the floating platform 10 is advantageously avoided as a result.

FIG. 2 shows a plan view of a second example of a floating platform 40. Arranged at a horizontal distance apart on a metal frame 42 are two buoyancy bodies 46, 48 which keep the floating platform 10 above the water surface. Arranged above crossbars 44 of the metal frame 42 is a control box 50 which optionally makes the voltage supply from a cable harness (not shown) available to the various electrical components of the floating platform 40, for example a winching device 54. The winching device 54 is a cable winch by means of which a pump 52 can be winched up and down.

FIG. 3 shows an illustration 60 of a nuclear facility pool having a nuclear facility pool cleaning device. A floating platform 62 floats on the water surface 82 of a nuclear facility pool 78 filled with water 80. By means of a winching device of the floating platform 62, a pump 66 is winchable onto the floor of the nuclear facility pool 78 via a cable 68. While it is operating, the pump 66 is intended to pump water from the pool floor into a vacuum hose 70 which leads into a connecting assembly 72 on the floating platform 62.

Provided in a manner exiting the connecting assembly 72 is a discharge hose 74 which in this example leads into a stationary external storage tank 76 at the pool edge, the pumped-out water being introduced into said storage tank 76.

The floating platform 62 additionally has a top-mounted control box 64, from which the drives and the winching device of the floating platform 62 are supplied. The control box 64 is for its part supplied with electric power via a cable harness 90 that is capable of floating, wherein the cable harness 90 also has a data line for the remote operation of the floating platform 62. The floating capability of the cable harness 90 is achieved by floating bodies 92. The cable harness 90 is connected at the pool edge to an external stationary transfer point 84 at which both an electric power supply and a data interface are provided.

LIST OF REFERENCE SIGNS

10 First example of floating platform
12 First buoyancy body of floating platform
14 Second buoyancy body of floating platform
16 Winching device
18 Winch sheave
20 Pump
22 Up and down winching direction of pump
24 Vacuum hose
26 First drive of drive device
28 Second drive of drive device
30 Fender
32 Metal frame
34 Water surface
40 Second example of floating platform
42 Metal frame
44 Crossbar of metal frame
46 First buoyancy body of floating platform
48 Second buoyancy body of floating platform
50 Control box
52 Pump
54 Winching device
60 Nuclear facility pool having nuclear facility pool cleaning device
62 Floating platform
64 Control box
66 Pump
68 Cable
70 Vacuum hose
72 Connecting assembly
74 Discharge hose
76 Stationary external storage tank
78 Nuclear facility pool
80 Water content of nuclear facility pool
82 Water surface
84 External stationary transfer interface
86 Remote control device
88 Operator
90 Cable harness capable of floating
92 Floating body of cable harness

The invention claimed is:

1. A nuclear facility pool cleaning device, comprising:
   a floating platform, configured for floating in water, having buoyancy bodies wherein the floating platform has a metal frame with the buoyancy bodies arranged in a manner spaced apart from one another on both sides of an axial centerline of the metal frame, the metal frame configured to have a portion above the water line and a portion below the water line;
   a drive device mounted from the floating platform for displacing the floating platform on a surface of a water-filled nuclear facility pool to be cleaned, the drive device configured to be mounted below the water line and within the metal frame;
   a winching device connected to the floating platform;
   a pump which is winchable vertically by the winching device and has a vacuum hose, connected thereto at its first end, for cleaning a bottom of the nuclear facility pool; and
   a remote control device for remotely operating at least the drive device and the winching device.

2. The nuclear facility pool cleaning device according to claim 1, comprising:
   a stationary external storage tank,
   wherein the second end of the vacuum hose leads at least indirectly into the stationary external storage tank.

3. The nuclear facility pool cleaning device according to claim 2, comprising:
   a connecting assembly provided at the second end of the vacuum hose; and
   a discharge hose wherein said connecting assembly connects said second end of the vacuum hose to the first end of the discharge hose, and a second end of the discharge hose leading into the stationary external storage tank.

4. The nuclear facility pool cleaning device according to claim 3, wherein the connecting assembly is connected to the floating platform.

5. The nuclear facility pool cleaning device according to claim 4, wherein the length of the vacuum hose corresponds at least to a depth of the nuclear facility pool to be cleaned.

6. The nuclear facility pool cleaning device according to claim 5, wherein the pump is winchable up and down by the winching device from an upper position within the floating platform to a lower position beneath the water surface onto a bottom of the nuclear facility pool to be cleaned.

7. The nuclear facility pool cleaning device according to claim 1, wherein the pump is winchable up and down by the winching device from an upper position within the floating platform to a lower position beneath the water surface onto the bottom of the nuclear facility pool to be cleaned.

8. The nuclear facility pool cleaning device according to claim 7, wherein the drive device comprises at least three drives, specifically
   one for axial forward motion, and
   two for laterally displacing and rotating the floating platform.

9. The nuclear facility pool cleaning device according to claim 1, wherein the drive device comprises at least three drives, specifically
   one for axial forward motion, and
   two for laterally displacing and rotating the floating platform.

10. The nuclear facility pool cleaning device according to claim 9, comprising:
    at least one overview camera provided on the floating platform.

11. The nuclear facility pool cleaning device according to claim 1, comprising:
    at least one overview camera is provided on the floating platform.

12. The nuclear facility pool cleaning device according to claim 11, wherein image data from the at least one overview camera are transferable to a display device of the remote control device and are able to be displayed there.

13. The nuclear facility pool cleaning device according to claim 12, comprising:
    light sources for illuminating a recording region of the at least one overview camera provided on the floating platform.

14. The nuclear facility pool cleaning device according to claim 11, comprising:
   light sources for illuminating a recording region of the at least one overview camera provided on the floating platform.

15. The nuclear facility pool cleaning device according to claim 1, comprising:
   a flexible cable harness wherein the floating platform is connected to an external stationary transfer interface by the cable harness that is configured for floating in water.

16. The nuclear facility pool cleaning device according to claim 15, wherein the cable harness comprises:
   electric power lines for supplying the floating platform with electric power.

17. The nuclear facility pool cleaning device according to claim 15, wherein the cable harness comprises:
   data lines for data exchange with the remote control device.

18. The nuclear facility pool cleaning device according to claim 1, wherein the winching device is arranged at least partially in an intermediate space formed between the buoyancy bodies.

19. The nuclear facility pool cleaning device according to claim 1, wherein the portion of the metal frame below the water within which the drive device is mounted has horizontally at least partially encircling fenders.

20. The nuclear facility pool cleaning device according to claim 1, comprising:
   a connecting assembly provided at the second end of the vacuum hose; and
   a discharge hose wherein said connecting assembly connects said second end of the vacuum hose to the first end of the discharge hose, and a second end of the discharge hose leading into a stationary external storage tank.

* * * * *